Patented May 22, 1923.

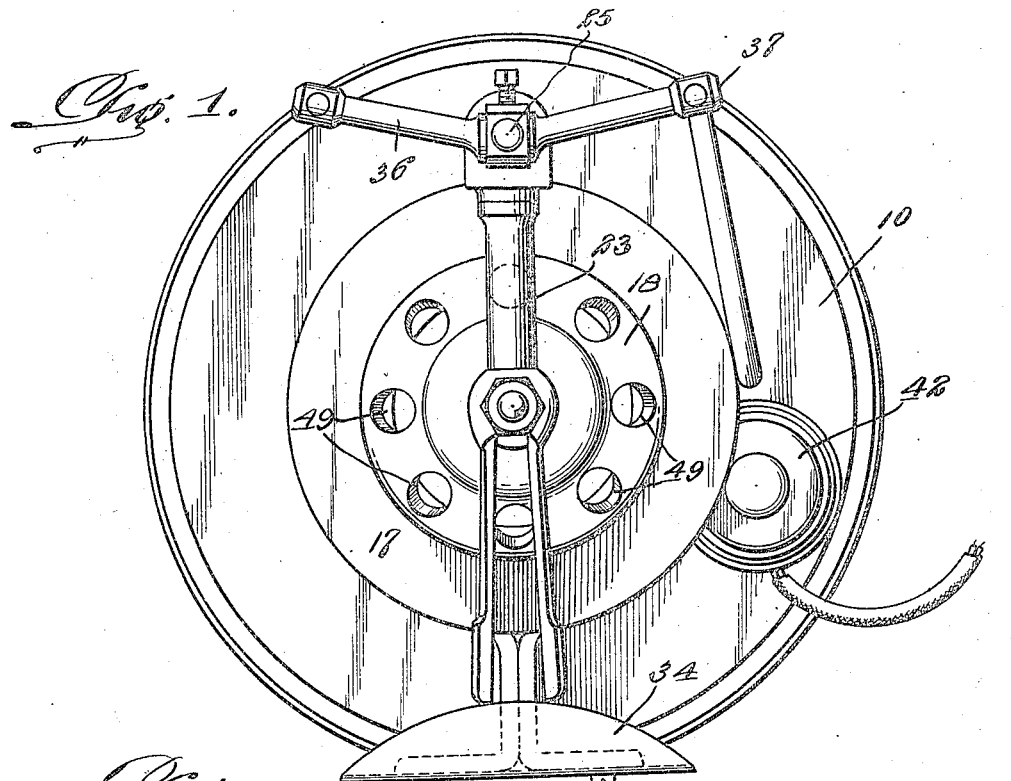
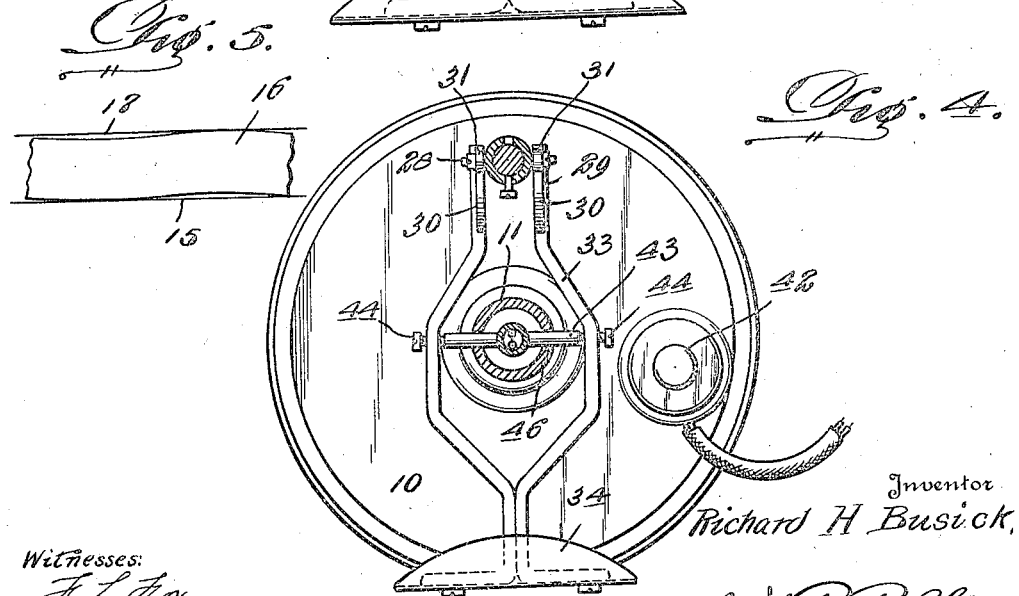

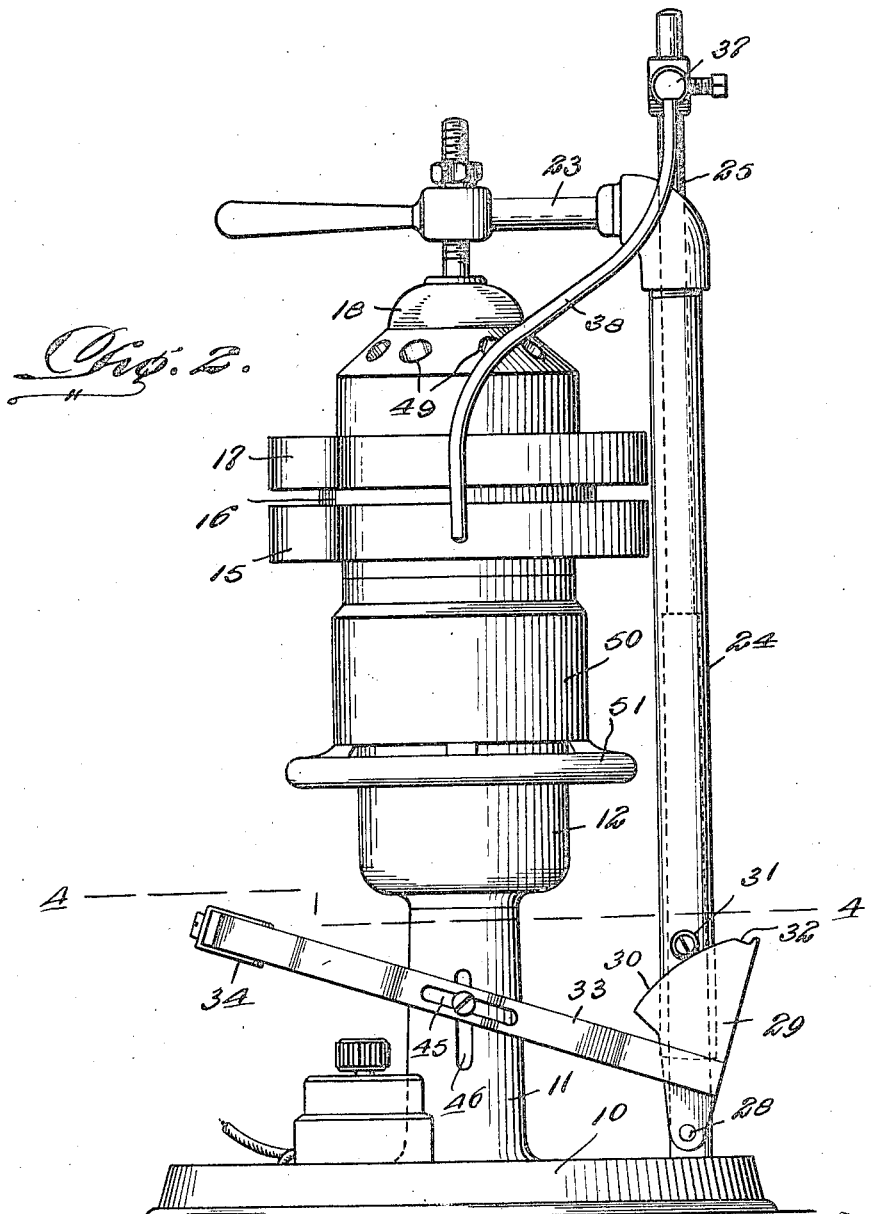

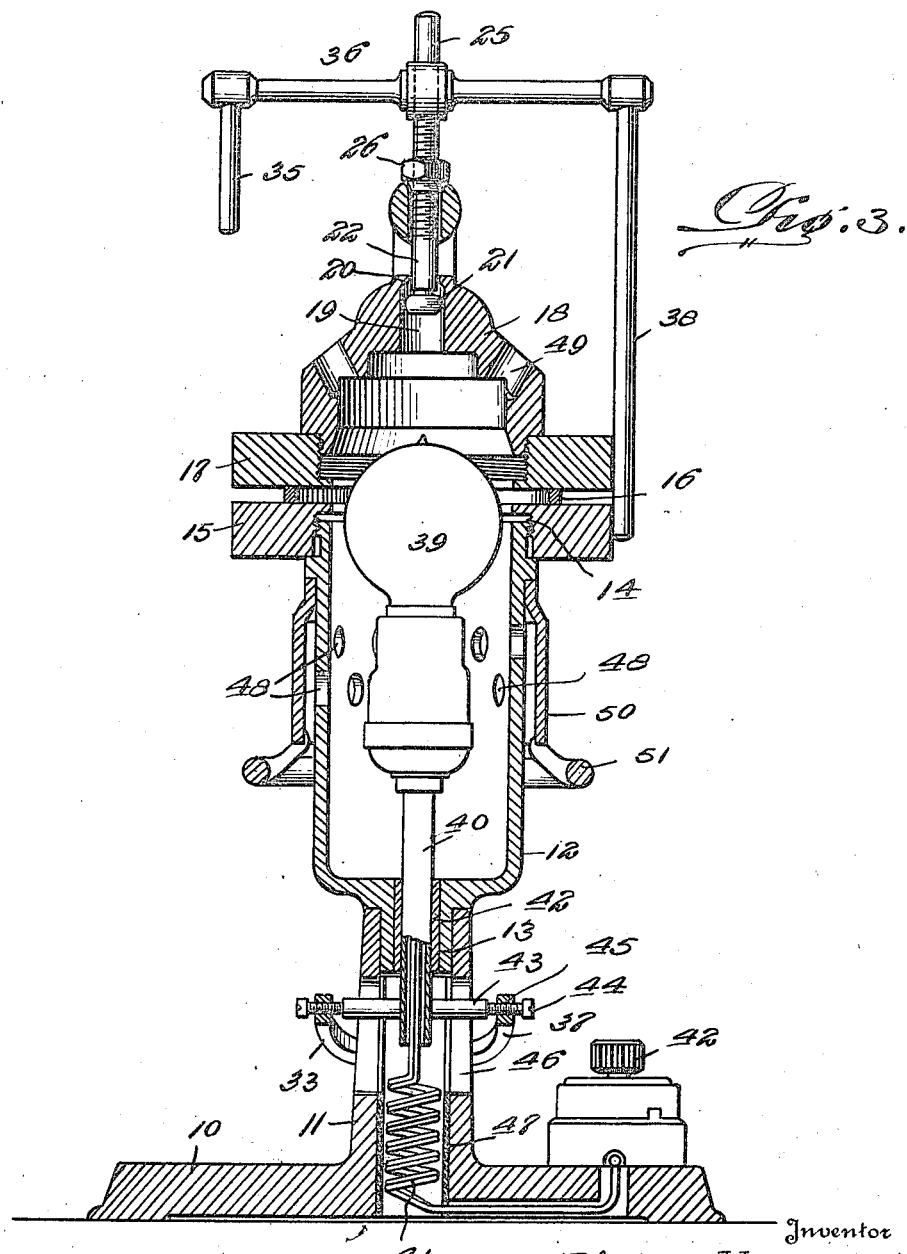

1,455,864

UNITED STATES PATENT OFFICE.

RICHARD H. BUSICK, OF BALTIMORE, MARYLAND.

PISTON-RING TESTER.

Application filed February 25, 1922. Serial No. 539,070.

*To all whom it may concern:*

Be it known that I, RICHARD H. BUSICK, citizen of the United States, residing at Baltimore, in the county of Baltimore City and State of Maryland, have invented certain new and useful Improvements in Piston-Ring Testers, of which the following is a specification.

This invention relates to test gauges.

An object of the present invention is the provision of means whereby the opposite surfaces or edges of an article may be tested for the detection of defects, the invention being especially designed for testing the opposite edges of piston packing rings, whereby waves or uneven surfaces may be easily seen.

Another object of the invention is the provision of a device as above set forth, which is simple in construction and by means of which tests may be made quickly and with accuracy and precision.

With the above and other objects in view, the invention further includes the following novel features and details of construction, to be hereinafter more fully described, illustrated in the accompanying drawings and pointed out in the appended claims.

In the drawings:—

Figure 1 is a top plan view of the invention.

Figure 2 is a side elevation of the same.

Figure 3 is a vertical central sectional view.

Figure 4 is a section on the line 4—4 of Figure 2.

Figure 5 is a fragmentary view of a portion of an imperfect piston ring.

Referring in detail to the drawings, wherein like characters of reference denote corresponding parts, the reference character 10 indicates a base of suitable shape and size, from which rises a sleeve 11, while extending above this sleeve and mounted for rotation is a cylindrical housing 12 which is open at its top. This housing is provided with a reduced downward extension 13 which is received within the upper end of the sleeve and is rotatable therein. Secured to the upper end of the housing 12 as by threads 14 or other suitable connecting means is a disk 15, the latter providing a horizontally disposed table or gauge which will be hereinafter referred to as the lower gauge. This gauge is adapted to support a piston ring as shown at 16 in Figures 2 and 3 of the drawings, or it may support articles of a different character.

Co-operating with the lower gauge 15 is an upper gauge 17 which is of a similar construction and is threadedly or otherwise connected to a dome-like cap or adapter 18. This cap is provided with a central opening 19 having an upper restricted end so as to provide a shoulder 20, the latter being adapted to engage a ball-like extremity 21 provided at one end of a supporting stud 22. This provides for a free universal connection between the adapter 18 and stud 22 and forms a connection whereby universal movement of the adapter is permitted. The stud 22 extends upward through an opening or slot provided in the end of an arm 23, the said opening extending to the outer end of this arm to facilitate the insertion and removal of the stud when desired. This arm further provides a handle for the manipulation of the upper gauge 17, as will be hereinafter apparent.

The inner end of the arm 23 extends from the upper end of a slide which is herein shown in the form of a sleeve 24 and this sleeve is capable of sliding movement upon a standard 25 which rises from the base 10. The stud 22 is threaded and has mounted thereon an adjusting nut 26 so that the said stud may be adjusted to permit the gauge 17 to rest freely on the upper edge of the ring 16.

Pivotally connected to the lower end of the standard 25 as shown at 28 are cams 29, whose arcuate cam surfaces 30 bear against rollers 31 positioned upon opposite sides of the sleeve 24, so that when the said cams are moved upon the pivots 28, the said sleeve will be raised and lowered to raise and lower the upper gauge 17. At one end of the arcuate cam surfaces 30 are seats 32, which are engaged by the rollers to yieldingly hold the sleeve in its elevated position. Extending from the cams 29 is a yoke-shaped lever 33, the latter embracing the sleeve 11 of the base and being provided with a handle or grip 34.

By operating the lever 33, the upper gauge may be elevated and the same moved laterally to one side of the center of the lower gauge 15, movement in this direction being limited by a stop 35 which extends downwardly from an arm 36. This arm is mounted for adjustment upon the upper end of the standard 25 as shown at 37 and is extended beyond the opposite side of the standard to support a forwardly and downwardly extending stop 38. The lower end of this stop bears against the periphery of the lower gauge 15 and when the upper gauge 17 has its periphery engaged with the stop, the said gauges will be axially aligned and the upper gauge may then be lowered into the position shown in Figures 2 and 3 of the drawings.

Located within the housing 12 is a source of light, herein shown in the form of an incandescent lamp 39. This lamp is carried at the upper end of a hollow stem 40 through which passes conductor wires 41 for connection in an electric circuit, a switch 42 being included in this circuit for controlling the light. The hollow stem 40 is slidable longitudinally through a bushing 42 located within the extension 13 of the housing 12 and extending radially from opposite sides of and connected to this bushing are studs 43. These studs have connected to their outer ends pivot screws 44 which pass through elongated slots 45 provided in the yoke-shaped lever 33, while the studs 43 pass through and move longitudinally in openings 46 provided in the sleeve 11. An insulating sleeve or bushing 47 is provided within the sleeve 11 so as to prevent short circuiting in the event of wear of insulation on the wires 41, due to frictional movement within the sleeve. The housing 12 and the adapter 18 are provided with openings 48 and 49 respectively to permit of the escape of heat from the lamp so that the gauges will not be affected. Secured to and surrounding the housing 12 is an apron or shield 50 which is designed to shield the eyes of the operator, while secured to the bottom of this apron or shield and surrounding the housing is an operating ring or wheel 51.

In the use of the invention, a ring is placed upon the lower gauge 15 and the upper gauge swung over above the top. The free end of the lever 34 is then elevated so that the upper gauge 17 will be lowered and rest freely on the upper edge of the ring 16 as shown in Figure 3 of the drawings, the supporting stud 22 being so adjusted as to be relieved of the weight of the upper gauge. Simultaneous with the lowering movement of the upper gauge, the lamp 39 will be elevated due to its connection with the lever 33, so that the lamp will likewise occupy the position shown in Figure 3. By looking between the gauges, any waves or defects in the opposite edges of the ring may be easily determined by the rays of light shining therethrough. By means of the ring or wheel 51, both gauges and piston ring may be rotated so that the said ring may be viewed for its entire circumference. By pressing downward upon the outer end of the lever 33, the upper gauge will be elevated until the rollers 31 enter the seats 32 of the cams 29 and during this elevating movement, the lamp 39 will be lowered so as to move it within the plane of the upper surface of the lower gauge 15. By this arrangement, danger or injury to the lamp in placing the packing rings upon the lower gauge and in moving the upper gauge into position, is obviated.

The invention is susceptible of various changes in its form, proportions and minor details of construction and the right is herein reserved to make such changes as properly fall within the scope of the appended claims.

Having described the invention what is claimed is:—

1. A test gauge comprising a support having openings therein and adapted to receive an article to be tested, a member also provided with openings and mounted above the support and capable of universal movement and adapted to rest upon the article and a source of light located within the openings provided in the support and member.

2. A test gauge comprising a rotatable support having openings therein and adapted to receive an article to be tested, a member also provided with openings and mounted above the support and capable of universal movement and adapted to rest upon the article and a source of light located within the openings provided in the support and member.

3. A test gauge comprising a rotatable support including a horizontally arranged disk adapted to receive an article to be tested, a second disk adapted to rest upon said article, each of said disks being provided with a central opening, a source of light within the openings and means for mounting the said second disk, whereby the latter will be permitted universal movement.

4. A test gauge comprising a rotatable support including a horizontally arranged disk adapted to receive an article to be tested, a second disk adapted to rest upon said article, said second disk being provided with a central opening, a source of light capable of movement into and out of the openings, means for supporting the said second disk, whereby the latter may be moved into and out of contact with the article and means whereby the said second disk and source of light may be simultaneously moved.

5. A test gauge comprising a rotatable support including a horizontally arranged disk adapted to receive an article to be tested, a second disk adapted to rest upon said article, each of said disks being provided with a central opening, a source of light capable of movement into and out of the openings, means for supporting the said second disk, whereby the latter may be moved into and out of contact with the article and means including a cam carried lever, whereby the second disk and source of light may be simultaneously moved.

6. A test gauge comprising a base, a housing rotatably mounted thereon and open at its upper end, a horizontally arranged annular article supporting flange surrounding the open end of the housing, an adapter, a flange surrounding the adapter to rest upon an article positioned upon the article supporting flange and a source of light within the housing and extending through the upper end thereof, into the adapter.

7. A test gauge comprising a base, a housing rotatably mounted thereon and open at its upper end, a horizontally arranged annular article supporting flange surrounding the open end of the housing, an adapter, a flange surrounding the adapter to rest upon an article positioned upon the article supporting flange, a source of light within the housing and extending through the upper end thereof and into the adapter and means whereby the adapter may be moved into and out of position.

8. A test gauge comprising a base, a housing rotatably mounted thereon and open at its upper end, a horizontally arranged annular article supporting flange surrounding the open end of the housing, an adapter, a flange surrounding the adapter to rest upon an article positioned upon the article supporting flange, a movable source of light within the housing, means whereby the adapter may be moved into and out of position and means whereby the source of light will be simultaneously moved with the adapter to project said light above the casing when the adapter is in position for use.

9. A test gauge comprising a base, a housing rotatably mounted thereon and open at its upper end, a horizontally arranged annular article supporting flange surrounding the open end of the housing, an adjustable adapter, a flange surrounding the adapter to rest upon an article positioned upon the article supporting flange and a source of light within the housing and extending through the upper end thereof.

10. A test gauge comprising a base, a housing rotatably mounted thereon and open at its upper end, a horizontally arranged annular article supporting flange surrounding the open end of the housing, an adapter, a flange surrounding the adapter to rest upon an article positioned upon the article supporting flange, a source of light within the housing and extending through the upper end thereof, a guide, means slidingly mounted upon the guide for connection to the adapter, means for adjustably connecting the adapter and slidingly mounted means, whereby the former may be moved into and out of position, a universal connection between the adapter and the slidingly mounted means and means whereby the last named means may be operated.

In testimony whereof I affix my signature.

RICHARD H. BUSICK.